June 27, 1967   G. G. GODA   3,327,900
LIQUID DISPENSING DEVICE
Filed Jan. 27, 1965
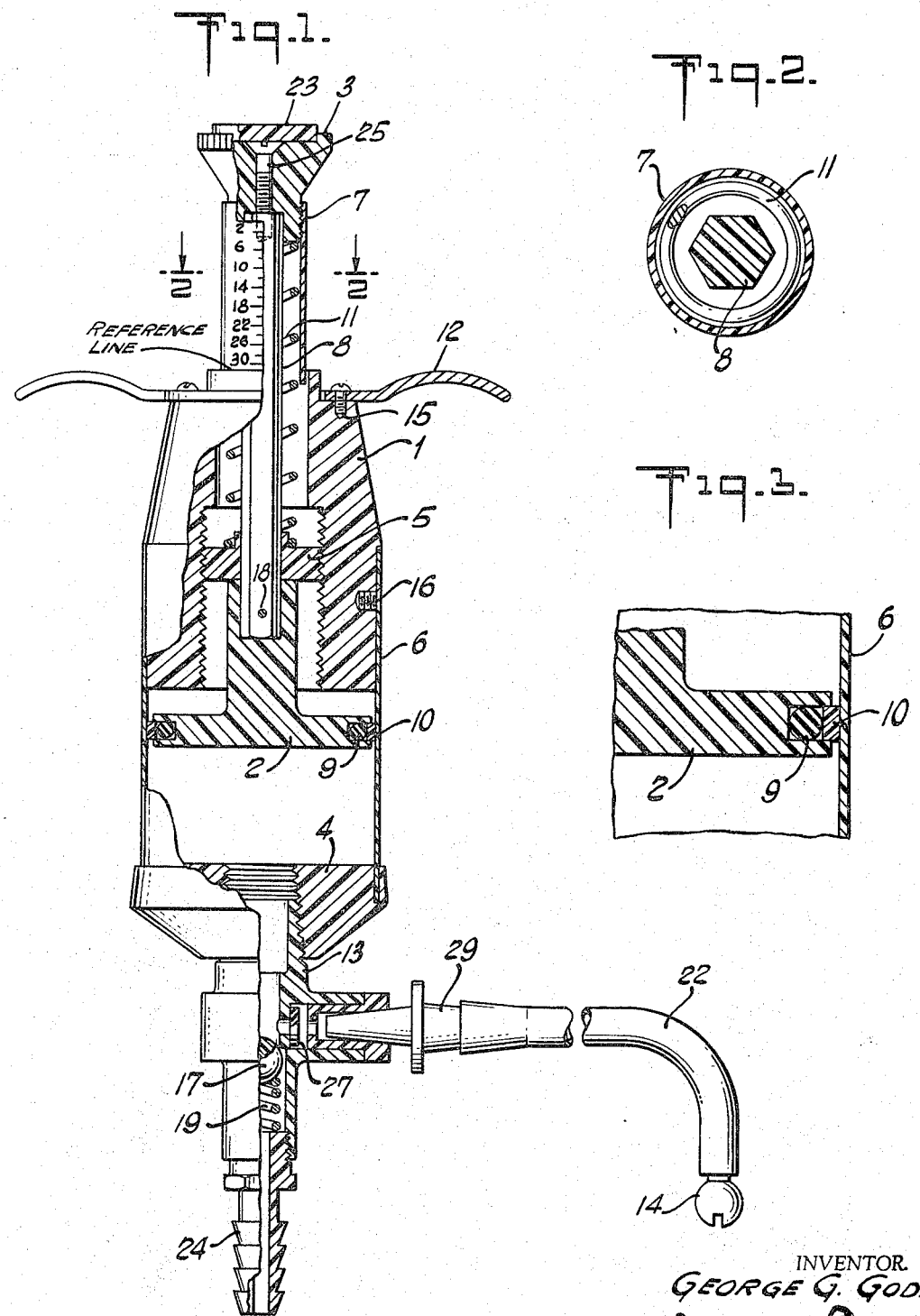
INVENTOR.
GEORGE G. GODA
BY Harry Levin
ATTORNEY

United States Patent Office 3,327,900
Patented June 27, 1967

1

3,327,900
LIQUID DISPENSING DEVICE
George G. Goda, New York, N.Y., assignor, by mesne assignments, to Greiner Scientific Corporation, New York, N.Y., a corporation of New York
Filed Jan. 27, 1965, Ser. No. 428,437
3 Claims. (Cl. 222—43)

This invention relates to liquid measuring and dispensing devices. More particularly the invention is concerned with burettes, pipettes, syringes and other devices for receiving and dispensing variable predetermined volumes of liquid repeatedly therefrom. Such devices are used in scientific and industrial laboratories, hospitals, medical research, animal injections, bottling of pharmaceuticals, and in other operations requiring quick and easy repetitive dispensing of equal volumes of liquids.

Such devices comprise a barrel and a plunger reciprocable therein, operable to draw a predetermined quantity of liquid into the barrel upon a determined movement of the plunger in one longitudinal direction in the barrel, followed by dispensation of the liquid from the barrel upon reverse movement of the plunger.

One object of this invention is to provide a measuring and dispensing device of the character described having improved characteristics of autoclavability for sterilization, mechanical simplicity and ease of construction, resistance to solvents and chemicals encountered, ease of operation and reliability.

Another object of this invention is to provide, in a measuring and dispensing device of the character described, simple means for presetting, at will, the volume of liquid to be dispensed therefrom and retaining the setting for repeated deliveries.

Still another object of this invention is to provide in a measuring and dispensing device of the character described, means for presetting the volume of liquid to be dispensed without making the tension on the plunger return spring in rest position depend on the magnitude of liquid volume selected to be dispensed. Such constancy of spring tension characteristics makes repeated deliveries of liquid less fatiguing on the hand of the person using the device.

Still another object of this invention is to provide in a measuring and dispensing device of the character described, variable means for presetting the volume of liquid to be dispensed, without the annoyance of additional protuberances from barrel nor plunger used in the prior art to limit plunger travel. This makes construction simpler and use more convenient.

Still another object of this invention is to provide in a measuring and dispensing device of the character described, means for minimizing the friction between plunger and barrel during the reciprocating travel of said plunger, yet retaining necessary liquid tightness, and allowing sufficiently free sliding reciprocating travel of the plunger for substantially fatigueless use of the device by the operator.

Still another object of this invention is to provide convenient means for delivering liquid from a single measuring and dispensing device of the character described, in any desired volume from about one milliliter to about fifty milliliters or more, at will. In contrast, dispensing devices of the barrel-plunger type on the market commonly require a multiplicity of dispensers to cover the

2 range of 2 to 10 milliliters because of excessive friction and concomitant fatigue to the user.

Other objects will be apparent in the fuller description which follows.

The invention comprises novel details of construction and novel combinations and arrangement of parts, as will appear from the following description. The drawing merely shows and the description merely describes a preferred embodiment of the present invention and is given by way of illustration or example.

FIG. 1 is a front elevational view partly in section, of a preferred embodiment of the invention.

FIG. 2 is an enlarged sectional view taken along lines 2—2 of FIG. 1.

FIG. 3 is a portion enlarged view of the corresponding part of FIG. 1.

Referring now to the drawings, FIG. 1 is a front elevational view partly in section of a repetitive dispensing device embodying the invention. Reference numeral 6 indicates a hollow cylinder whose internal wall is rigid low friction synthetic polymer or plastic. Preferably, but not necessarily, the cylinder is stainless steel for greater strength and resistance to corrosion; the lining or sleeve is preferably a polyfluorocarbon (available from Du Pont under its trade name Teflon) for its low coefficient of friction, heat stability, ease of cleaning and because ordinarily nothing sticks to it.

Reference numeral 1 indicates a snug fitting plug, with central vertical opening, which partially recesses into and is retained by cylinder 6, at one end thereof, and supports and guides moving parts of the device. Screw 16 connects and locks this plug in cylinder 6. This plug could be made of corrosion resistant metal, for example, but for economy, smoothness and ease of assembly and operation of the device it is preferably made of a synthetic polymer not deformed by moderately high temperatures, polypropylene for example. Part of the inner wall of this plug is threaded to accommodate the vertical movement of collar-like adjusting nut 5, about which more will be said later. Reference numeral 4 indicates a tight fitting plug with a threaded opening therein, which with valve body 13 and its appendages closes the other end of cylinder 6. Plug 4, plug 1, valve body 13, adapter 29, discharge tip 24, are also preferably made of polypropylene and for the same reasons. Cylinder 6 is fixedly and liquid tightly retained in plug 4 by pressed fit.

Piston 2 is circumferentially grooved to accommodate an elastic O-ring 9 and a resilient slip ring 10, the former completely recessed and the latter partially recessed and partially extending outwardly from the groove to effect slidable liquid tight contact with the inner wall of cylinder 6. The O-ring serves to radially cushion and back the slip ring. The O-ring is preferably silicone rubber for its heat stability and elasticity and the slip ring is preferably Teflon for its heat stability and low friction characteristics. FIG. 3 is an enlarged view showing this liquid exclusion means.

Elongated hexagonal driving member 8 is held at its lower end in a matching recess in the neck of piston 2 and firmly retained by connecting pin 18. This driving member passes slidably thru a matching opening in collar-like adjusting nut 5 to transmit forces applied to vertically displace piston 2 and serves as a key-like rotationally engaging member to drive nut 5 vertically and thereby move piston 2 correspondingly. Member 8 extends thru encircling piston return spring 11, stainless steel calibrated scale tube 7 and his held at its upper end recessed in rotating knob 3 and firmly retained by screw 25. Resilient finger pad 23 is provided for comfort. The lower end of piston return spring 11 presses against the upper surface of adjusting nut 5 and its upper end presses against the lower surface of rotating knob 3. This arrangement of parts makes the tension on the piston return spring at rest position independent of the magnitude of liquid volume selected to be dispensed. This constancy of spring tension makes repeated deliveries of liquid less fatiguing on the hand of the person using the device. The lower external wall of rotating knob 3 and the upper internal wall of calibrated scale tube 7 are matchingly threaded to engage and retain the scale tube against excessive lateral movement in its travel up and down inside plug 1. Scale tube 7 passes slidably thru the top central opening of upper plug 1.

The usual finger grip yoke 12 is firmly retained on plug 1 by screws 15.

FIGURE 2 is an enlarged sectional view showing the arrangement of calibrated scale tube 7, piston return spring 11 and elongated hexagonal driving member 8. Manifestly, elongated driving member 8 is not limited to hexagonal cross section, its cross sectional function being merely to engage and rotate adjusting nut 5, when desired.

The appendages to valve body 13, completing the intake and discharge system, consist of neoprene valve ball 17, stainless steel valve spring 19, silicone valve disc 27, polypropylene adapter 29, flexible vinyl tubing 22, metal sinker 14 with opening therein and polypropylene dispensing tip 24. Adapter 29 makes easy friction connections to valve body 13 and tubing 22. The chemical nature of these parts is obviously not restricted to these materials.

To operate this device rotate knob 3 until the numerical indication on scale tube 7 at the top edge of plug 1 (reference line) corresponds to the volume of liquid in milliliters desired to be dispensed in one downward stroke of the plunger assembly. This preset dispensing volume persists thru repeated dispensings or until reset for a different selected volume. Turning knob 3 moves, via elongated key-like member 8, adjusting nut 5 to establish a top stop position for piston 2 to achieve a dispensing volume corresponding to the numerical indication on the calibrated scale tube 7. The bottom stop position for piston 2 is in all cases the top of plug 4. With sinker 14 immersed in a reservoir of liquid to be dispensed and the apparatus (FIG. 1) held with fingers under grips 12 and thumb on pad 23, depressing with thumb a full stroke will displace the air from below the piston; releasing the thumb pressure effects return of piston 2 by coil spring 11 and draws liquid from the reservoir to replace the displaced air; the next downward stroke delivers from dispensing tip 24 the preset volume of liquid; repetition of these simple operations effects repetitive deliveries of equal volumes. To clear the pertinent parts of air may take several strokes initially.

By having parts of the apparatus made of corrosion resistant, chemicals and solvent resistant, temperature stable materials, the entire apparatus is autoclavable for sterilization. Such practical materials may be selected from synthetic polymers, plastics and resins, for example Teflon (polyfluorocarbons), polypropylene, nylon; metals, for example stainless steel or cheaper metals plated with corrosion resistant surfaces; glass. For example, top or bottom-plugs 1 and 4, piston 2, adjusting nut 5, valve body 13, discharge tip 24, or adapter 29 may be made of stainless steel or other resistant metals or glass, but for economy, durability, ease of assembly or smoothness of operation of the device preferred materials are synthetic polymers or plastics not deformed by moderately high temperatures, resistant to ordinary chemicals and solvents, and such materials are commercially available, for example polypropylene, polyfluorocarbons (Teflon) and nylon. Even cylinder 6 may be made of such materials, but stainless steel is preferred.

Although it will be generally preferable that tubular barrel 6 be circular in cross section, other configurations can be made operable by use of an engagement, such as ball and socket, which permits reciprocal vertical transfer of motion from elongated member 8 to piston 2 and permits rotational motion of elongated member 8 independently of piston member 2.

Although an exemplary embodiment of the invention has been disclosed and discussed, it will be understood that other applications of the invention are possible and that the embodiment disclosed may be subjected to various changes, modifications and substitutions without departing from the spirit of the invention.

I claim:
1. A liquid dispensing device comprising a cylindrical barrel having an upward open end and a downward open end; an upper plug member, having an opening therein substantially concentric with said upward open end of said cylindrical barrel, retained partially recessed in said upward open end; a downward plug member having an opening therein, liquid tightly circumferentially retained at the downward open end of said cylindrical barrel; a piston reciprocably slidable within said barrel, said piston being circumferentially grooved, an elastic O-ring retained and recessed in said groove, a compact resilient low friction synthetic plastic slip ring substantially concentrically disposed around said O-ring retained in said groove and extending outwardly therefrom to effect liquid tight slidable contact with the internally travelled wall of said barrel; an elongated member, one end thereof engaging said piston and movable therewith, extending upwardly therefrom; variable stop means within said barrel upward of said piston to limit the upward travel thereof; calibrated means to adjustably position said variable stop means; operating means for effecting downward movement of said piston; spring means to upwardly return said piston; valved intake and discharge means at said downward plug member to permit drawing liquid from a reservoir and repeatedly dispensing same in equal volumes.

2. A liquid dispensing device comprising a cylindrical barrel having an upward open end and a downward open end; an upper plug member, having an opening therein substantially concentric with said upward open end of said cylindrical barrel, retained partially recessed in said upward open end; a downward plug member having an opening therein, liquid tightly circumferentially retained at the downward open end of said cylindrical barrel; a piston reciprocably slidable within said barrel, said piston being circumferentially grooved, a silicone rubber O-ring retained and recessed in said groove, a polyfluorocarbon slip ring substantially concentrically disposed around said O-ring retained in said groove and extending outwardly therefrom to effect liquid tight slidable contact with the internally travelled wall of said barrel; an elongated member, one end thereof engaging said piston and movable therewith, extending upwardly therefrom; variable stop means within said barrel upward of said piston to limit the upward travel thereof; calibrated means to adjustably position said variable stop means; operating means for effecting downward movement of said piston; spring means to upwardly return said piston; valved intake and discharge means at said downward plug member to permit drawing liquid from a reservoir and repeatedly dispensing same in equal volumes.

3. A liquid dispensing device comprising a cylindrical barrel having an upward open end and a downward open end; an upper plug member, having an opening therein substantially concentric with said upward open end of said cylindrical barrel, retained partially recessed in said upward open end; a downward plug member having an opening therein, liquid tightly circumferentially retained at the downward open end of said cylindrical barrel; a piston reciprocably slidable within said barrel; an elongated member, one end thereof engaging said piston and movable therewith, extending upwardly therefrom; variable stop means within said barrel upward of said piston to limit the upward travel thereof, said variable stop means comprising an externally threaded nut with opening therein slidably passing said elongated member and rotatably engageable thereby and an internally threaded wall engaging said externally threaded nut; calibrated means to adjustably position said variable stop means; operating means for effecting downward movement of said piston; spring means to upwardly return said piston; valved intake and discharge means at said downward plug member to permit drawing liquid from a reservoir and repeatedly dispensing same in equal volumes.

References Cited
UNITED STATES PATENTS

| | | | |
|---|---|---|---|
| 1,919,173 | 7/1933 | Schutt | 222—309 X |
| 2,464,030 | 3/1949 | Engstrom | 222—309 |
| 2,660,342 | 11/1953 | Ruf | 222—309 |
| 3,118,568 | 1/1964 | Bishop et al. | 222—309 X |
| 3,155,289 | 11/1964 | Kauss | 222—309 X |

ROBERT B. REEVES, *Primary Examiner.*

CHARLES R. CARTER, *Examiner.*